US010328928B2

(12) United States Patent
Kanayama et al.

(10) Patent No.: US 10,328,928 B2
(45) Date of Patent: Jun. 25, 2019

(54) HYBRID VEHICLE INCLUDING A MODE SELECTION DEVICE

(71) Applicant: TOYOTA JIDOSHA KABUSHIKI KAISHA, Toyota-shi, Aichi-ken (JP)

(72) Inventors: Takeshi Kanayama, Toyota (JP); Eiji Yanagida, Toyota (JP); Koichi Ichikawa, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/032,546

(22) Filed: Jul. 11, 2018

(65) Prior Publication Data

US 2019/0023261 A1 Jan. 24, 2019

(30) Foreign Application Priority Data

Jul. 18, 2017 (JP) ................................. 2017-139110

(51) Int. Cl.
*B60W 20/20* (2016.01)
*B60W 20/16* (2016.01)
(Continued)

(52) U.S. Cl.
CPC ............. *B60W 20/20* (2013.01); *B60K 6/48* (2013.01); *B60W 20/16* (2016.01); *F01N 3/023* (2013.01); *F01N 9/002* (2013.01); *F02D 41/029* (2013.01); *B60W 2510/068* (2013.01); *B60W 2530/12* (2013.01); *F01N 2900/1404* (2013.01)

(58) Field of Classification Search
CPC .. B60W 20/15; F01N 3/00; F01N 3/18; F01N 1/00; F01N 3/20
See application file for complete search history.

(56) References Cited

U.S. PATENT DOCUMENTS 5,000,150 A * 3/1991 Miyama ................ F02P 5/1521
123/406.33
2004/0226539 A1* 11/2004 Takahashi ............... F02D 17/02
123/406.33
(Continued)

FOREIGN PATENT DOCUMENTS

EP 2 511 491 A1 10/2012
JP 2-305368 A 12/1990
(Continued)

*Primary Examiner* — James A Shriver, II
*Assistant Examiner* — James J Triggs
(74) *Attorney, Agent, or Firm* — Sughrue Mion, PLLC

(57) ABSTRACT

There is provided a hybrid vehicle comprising a mode selection device configured to select one drive mode among a plurality of drive modes according to a user's operation. The plurality of drive modes include a first drive mode in which the hybrid vehicle is driven with power from a motor with stopping rotation of an engine and a second drive mode in which the hybrid vehicle is driven with rotation of the engine. On satisfaction of filter regeneration conditions that an accumulated amount of particulate matter accumulated on a filter is equal to or greater than a predetermined accumulated amount and that a temperature of the filter is equal to or higher than a predetermined temperature, the hybrid vehicle is driven in the second drive mode even when the first drive mode is selected by the mode selection device.

8 Claims, 7 Drawing Sheets

(51) Int. Cl.
  *B60K 6/48* (2007.10)
  *F02D 41/02* (2006.01)
  *F01N 3/023* (2006.01)
  *F01N 9/00* (2006.01)

(56) References Cited

U.S. PATENT DOCUMENTS

| | | | |
|---|---|---|---|
| 2016/0339905 A1* | 11/2016 | Inoue | B60K 6/445 |
| 2017/0096136 A1 | 4/2017 | Nawata et al. | |
| 2018/0099656 A1 | 4/2018 | Otsuka et al. | |
| 2018/0106206 A1* | 4/2018 | Tsunoda | B60W 20/16 |
| 2018/0216552 A1* | 8/2018 | Yokoi | B60W 20/16 |

FOREIGN PATENT DOCUMENTS

| | | |
|---|---|---|
| JP | 2002-188491 A | 7/2002 |
| JP | 2004-340077 A | 12/2004 |
| JP | 2005-090259 A | 4/2005 |
| JP | 2005-120889 A | 5/2005 |
| JP | 2005-194885 A | 7/2005 |
| JP | 2006-266213 A | 10/2006 |
| JP | 2007-230475 A | 9/2007 |
| JP | 2008-106687 A | 5/2008 |
| JP | 2009-024589 A | 2/2009 |
| JP | 2009-156100 A | 7/2009 |
| JP | 2009-203934 A | 9/2009 |
| JP | 2009-270523 A | 11/2009 |
| JP | 2011-099451 A | 5/2011 |
| JP | 2012-219732 A | 11/2012 |
| JP | 2014-222028 A | 11/2014 |
| JP | 2015-034468 A | 2/2015 |
| JP | 2015-128935 A | 7/2015 |
| JP | 2015-140150 A | 8/2015 |
| JP | 2015-174627 A | 10/2015 |
| JP | 2015-202832 A | 11/2015 |
| JP | 2017-030745 A | 2/2017 |
| JP | 2017-128152 A | 7/2017 |
| JP | 2017-132299 A | 8/2017 |
| JP | 2017-132300 A | 8/2017 |
| JP | 2017-155729 A | 9/2017 |
| JP | 2017-177823 A | 10/2017 |
| JP | 2017-177877 A | 10/2017 |
| JP | 2018-62199 A | 4/2018 |
| JP | 2018-65448 A | 4/2018 |
| JP | 2018-69779 A | 5/2018 |
| JP | 2018-75919 A | 5/2018 |
| JP | 2018-83570 A | 5/2018 |
| JP | 2018-90154 A | 6/2018 |
| JP | 2018-90202 A | 6/2018 |
| JP | 2018-122620 A | 8/2018 |

* cited by examiner

HYBRID VEHICLE INCLUDING A MODE SELECTION DEVICE

CROSS-REFERENCE TO RELATED APPLICATION

This application claims priority to Japanese Patent Application No. 2017-139110 filed on Jul. 18, 2017, the contents of which is incorporated herein by reference.

TECHNICAL FIELD

The present disclosure relates to a hybrid vehicle or more specifically to a hybrid vehicle including an engine for driving that is equipped with a filter configured to remove particulate matter in an exhaust system, a motor, and a mode selection device.

BACKGROUND

A proposed configuration of a hybrid vehicle includes an engine equipped with a filter for removal of particulate matter in an exhaust system, and a motor generator connected with an output shaft of the engine (as described in, for example, JP 2015-140150A). When there is a request for regeneration of the filter and the temperature of the filter is within a first temperature range, this hybrid vehicle performs regeneration control that causes the engine to be motored by the motor generator and supply the air containing oxygen to the filter, such that the rotation speed of the engine becomes equal to a predetermined rotation speed in the state that fuel injection of the engine is at stop. This causes combustion of the particulate matter accumulated on the filter and accordingly achieves regeneration of the filter.

CITATION LIST

Patent Literature

PTL 1: JP2015-140150A

SUMMARY

The hybrid vehicle may include the engine described above, a motor for driving, and a mode selection device configured to select one drive mode among a plurality of drive modes according to the user's operation. The plurality of drive modes include a first drive mode in which the hybrid vehicle is driven with power from the motor with stopping rotation of the engine, and a second drive mode in which the hybrid vehicle is driven with rotation of the engine. When this hybrid vehicle is always driven in the first drive mode in response to selection of the first drive mode by the mode selection device as the drive mode, stopping rotation of the engine fails to secure the opportunity for regeneration of the filter.

A hybrid vehicle of the present disclosure mainly aims to secure the opportunity for regeneration of a filter when a first drive mode in which the hybrid vehicle is driven with power from a motor with stopping rotation of an engine is selected as the drive mode.

In order to achieve the above primary object, the hybrid vehicle of the disclosure is implemented by an aspect described below.

The present disclosure is directed to a hybrid vehicle. The hybrid vehicle includes an engine for driving equipped with a filter for removal of particulate matter in an exhaust system, a motor for driving, a mode selection device configured to select one drive mode among a plurality of drive modes according to a user's operation, wherein the plurality of drive modes include a first drive mode in which the hybrid vehicle is driven with power from the motor with stopping rotation of the engine and a second drive mode in which the hybrid vehicle is driven with rotation of the engine, and a control device configured to control the engine and the motor. On satisfaction of filter regeneration conditions that an accumulated amount of the particulate matter accumulated on the filter is equal to or greater than a predetermined accumulated amount and that a temperature of the filter is equal to or higher than a predetermined temperature, the control device causes the hybrid vehicle to be driven in the second drive mode even when the first drive mode is selected by the mode selection device.

On satisfaction of the filter regeneration conditions that the accumulated amount of the particulate matter accumulated on the filter is equal to or greater than the predetermined accumulated amount and that the temperature of the filter is equal to or higher than the predetermined temperature, even when the first drive mode is selected by the mode selection device, the hybrid vehicle of this aspect is driven in the second drive mode. This configuration enables the engine to be rotated and supply the air to the filter even when the first drive mode is selected by the mode selection device. As a result, this secures the opportunity for regeneration of the filter.

BRIEF DESCRIPTION OF DRAWINGS

FIG. 8 is a diagram showing one example of a relationship of an accumulated amount of PM Qpm and a cleaning frequency Fpc to a drive mode at a constant value of a PM accumulation speed Vpm when an EV switch is ON;

FIG. 9 is a diagram showing one example of a relationship of the PM accumulation speed Vpm and the cleaning frequency Fpc to the drive mode at a constant value of the accumulated amount of PM Qpm when the EV switch is ON;

DESCRIPTION OF EMBODIMENTS

The following describes aspects of the present disclosure with reference to some embodiments.

Embodiment

Figure 1:
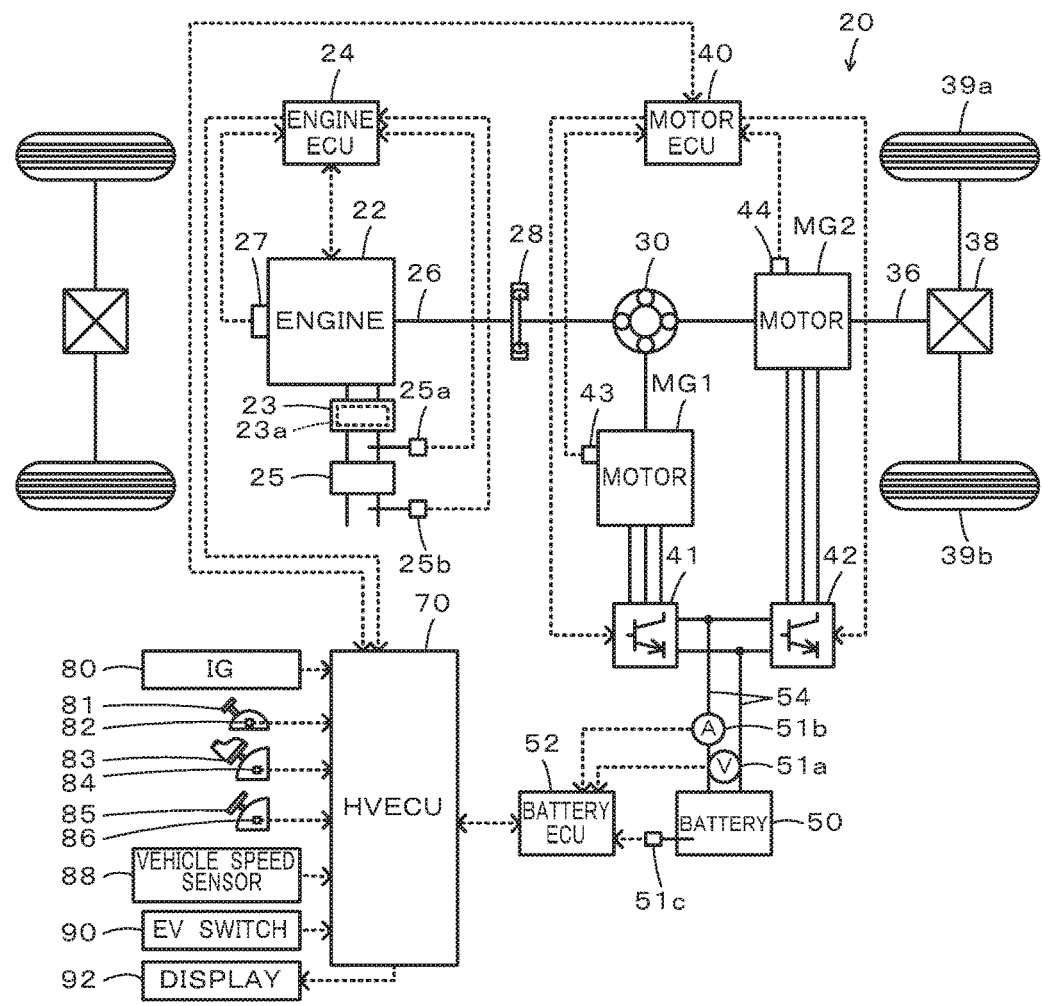
FIG. 1 is a configuration diagram illustrating the schematic configuration of a hybrid vehicle according to one embodiment of the present disclosure.

FIG. 1 is a configuration diagram illustrating the schematic configuration of a hybrid vehicle 20 according to one embodiment of the present disclosure. As illustrated, the hybrid vehicle 20 of the embodiment includes an engine 22, a planetary gear 30, motors MG1 and MG2, inverters 41 and 42, a battery 50 as a power storage device, a display 92, and a hybrid electronic control unit (hereinafter referred to as "HVECU") 70.

The engine 22 is configured as an internal combustion engine to output power using, for example, gasoline or light oil as a fuel. An exhaust emission control device 23 and a particulate matter removal filter (hereinafter referred to as "PM filter") 25 are provided in an exhaust system of the engine 22. The exhaust emission control device 23 is filled with a catalyst 23a that removes uncombusted fuel and nitrogen oxides included in exhaust emission. The PM filter 25 is made from, for example, a ceramic material or stainless steel as a porous filter and is configured to remove particulate matter (PM) such as soot included in the exhaust emission. The engine 22 is subjected to operation control by an engine electronic control unit (hereinafter referred to as engine ECU) 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22 are input into the engine ECU 24 via the input port. The signals input into the engine ECU 24 include, for example, a crank angle θcr from a crank position sensor 27 configured to detect the rotational position of a crankshaft 26 and a cooling water temperature Tw from a water temperature sensor (not shown) configured to detect the temperature of cooling water of the engine 22. The input signals also include a throttle position TH from a throttle valve position sensor (not shown) configured to detect the position of a throttle valve, an intake air flow Qa from an air flowmeter (not shown) mounted to an air intake pipe, and an intake air temperature Ta from a temperature sensor (not shown) mounted to the air intake pipe. The input signals additionally include pressures P1 and P2 from pressure sensors 25a and 25b provided on an upstream side and a downstream side of the PM filter 25 in the exhaust system. Various control signals for operation control of the engine 22 are output from the engine ECU 24 via the output port. The signals output from the engine ECU 2124 include, for example, a drive control signal to a throttle motor configured to regulate the position of the throttle valve, a drive control signal to a fuel injection valve, and a drive control signal to an ignition coil integrated with an igniter. The engine ECU 24 is connected with the HVECU 70 via the respective communication ports. The engine ECU 24 calculates a rotation speed Ne of the engine 22, based on the crank angle θcr from the crank position sensor 27. The engine ECU 24 also calculates a volume efficiency KL (i.e., a ratio of a volume of the actual intake air in one cycle to a stroke volume of one cycle of the engine 22), based on the intake air flow Qa from the air flowmeter and the rotation speed Ne of the engine 22. Additionally, the engine ECU 24 calculates an accumulated amount of PM Qpm that is an amount of particulate matter accumulated on the PM filter 25, based on a pressure difference ΔP (ΔP=P1−P2) between the pressures P1 and P2 from the pressure sensors 25a and 25b, and also calculates a filter temperature Tf that is a temperature of the PM filter 25, based on the operation conditions (the rotation speed Ne and the volume efficiency KL) of the engine 22.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via a damper 28.

The motor MG1 is configured, for example, as a synchronous generator motor and includes the rotor that is connected with the sun gear of the planetary gear 30 as described above. The motor MG2 is configured, for example, as a synchronous generator motor and includes a rotor that is connected with the driveshaft 36. The inverters 41 and 42 are connected with the motors MG1 and MG2 and are also connected with the battery 50 via power lines 54. A motor electronic control unit (hereinafter referred to as "motor ECU") 40 performs switching control of a plurality of switching elements (not shown) included in the inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2, for example, rotational positions θm1 and θm2 from rotational position detection sensors 43 and 44 configured to detect the rotational positions of the respective rotors of the motors MG1 and MG2 and phase currents from current sensors configured to detect electric currents flowing in the respective phases of the motors MG1 and MG2, are input into the motor ECU 40 via the input port. The motor ECU 40 outputs via the output port, for example, switching control signals to the plurality of switching elements (not shown) included in the inverters 41 and 42. The motor ECU 40 is connected with the HVECU 70 via the respective communication ports. The motor ECU 40 calculates rotation speeds Nm1 and Nm2 of the motors MG1 and MG2, based on the rotational positions θm1 and θm2 of the respective rotors of the motors MG1 and MG2 from the rotational position detection sensors 43 and 44.

The battery 50 is configured as, for example, a lithium ion rechargeable battery or a nickel metal hydride battery and is connected with the inverters 41 and 42 via the power lines 52. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals required for management of the battery 50 are input into the battery ECU 52 via the input port. The signals input into the battery ECU 52 include, for example, a voltage Vb of the battery 50 from a voltage sensor 51a placed between terminals of the battery 50, an electric current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC, based on an integrated value of the electric current Ib of the battery 50 from the current sensor 51b, and also calculates input and output limits Win and Wout, based on the calculated state of charge SOC and the temperature Tb of the battery 50 from the temperature sensor 51c. The state of charge SOC denotes a ratio of the capacity of electric power dischargeable from the battery 50 to the overall capacity of the battery 50. The input and output limits Win and Wout denote allowable charge and discharge electric powers chargeable into and dischargeable from the battery 50.

The display 92 is provided in front of a driver's seat in a passenger compartment and is configured to display various information to passengers. The display 92 is controlled by the HVECU 70.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, a vehicle speed V from a vehicle speed sensor 88, and an EV switch signal SWEV from an EV switch 90 operated to give an instruction for driving in a motor drive mode (EV drive mode) described later. The HVECU 70 outputs, via the output port, a control signal to the display 92. The HVECU 70 is connected with the engine ECU 24, the motor ECU 40 and the battery ECU 52 via the respective communication ports.

The hybrid vehicle 20 of the embodiment having the above configuration may be driven in a hybrid drive mode (HV drive mode) with rotation (operation or fuel cutting during operation) of the engine 22 or in a motor drive mode (EV drive mode) with stop of rotation (stop of operation) of the engine 22.

In the HV drive mode, the HVECU 70 sets a required torque Td* that is required for driving (i.e., required for the driveshaft 36), based on the accelerator position Acc, the brake pedal position BP and the vehicle speed V, and calculates a required power Pd* that is required for driving (i.e., required for the driveshaft 36) by multiplying the set required torque Td* by a rotation speed Nd of the driveshaft 36 (for example, the rotation speed Nm2 of the motor MG2). The HVECU 70 subsequently sets a required charge-discharge power Pb* of the battery 50 (which takes a positive value when the battery 50 is discharged), based on the state of charge SOC of the battery 50. The HVECU 70 then calculates a required power Pe* that is required for the vehicle (i.e., required for the engine 22) by subtracting the required charge-discharge power Pb* of the battery 50 from the required power Pd*. After setting the required power Pe*, the HVECU 70 basically sets a target rotation speed Ne* and a target torque Te* of the engine 22 and torque commands Tm1* and Tm2* of the motors MG1 and MG2, such that the required power Pe* is output from the engine 22 and that the required torque Td* is output to the driveshaft 36. The HVECU 70 then sends the target rotation speed Ne* and the target torque Te* of the engine 22 to the engine ECU 24, while sending the torque commands Tm1* and Tm2* of the motors MG1 and MG2 to the motor ECU 40. When receiving the target rotation speed Ne* and the target torque Te* of the engine 22, the engine ECU 24 performs, for example, intake air flow control, fuel injection control and ignition control of the engine 22, such that the engine 22 is operated with the target rotation speed Ne* and the target torque Te*. When receiving the torque commands Tm1* and Tm2* of the motors MG1 and MG2, the motor ECU 40 performs switching control of the plurality of switching elements included in the inverters 41 and 42, such as to drive the motors MG1 and MG2 with the torque commands Tm1* and Tm2*.

When the required power Pe* becomes lower than a reference value Psp (for example, 7 kW, 8 kW or 9 kW) during load operation of the engine 22, the hybrid vehicle 20 of the embodiment starts fuel cutting of the engine 22 or non-load operation of the engine 22 in the HV drive mode. When fuel cutting of the engine 22 is performed, the hybrid vehicle 20 of the embodiment may cause the engine 22 to be motored by the motor MG1 or may not cause the engine 22 to be motored by the motor MG1. When the engine 22 is motored at an OFF position of the EV switch 90, the engine 22 and the motor MG1 are controlled such that the rotation speed Ne of the engine 22 becomes equal to or higher than a rotation speed Nemin. The rotation speed Nemin is set to be a rotation speed out of a resonance range Ar that causes resonance in the vehicle and that is not lower than a rotation speed Nr1 (for example, 350 rpm, 400 rpm or 450 rpm) and not higher than a rotation speed Nr2 (for example, 550 rpm, 600 rpm or 650 rpm) and to be higher than the rotation speed Nr2. The rotation speed Nemin is, for example, 950 rpm, 1000 rpm or 1050 rpm. Motoring of the engine 22 such that the rotation speed Ne of the engine 22 becomes equal to the rotation speed Nemin suppresses vibration. When fuel cutting of the engine 22 is performed without causing the engine 22 to be motored by the motor MG1, the drive mode is shifted to the EV drive mode with stop of rotation of the engine 22.

In the HV drive mode, when the required power Pe* becomes equal to or higher than a reference value Pst (a predetermined value Pst1 or a predetermined value Pst2 described later) that is higher than the reference value Psp without load operation of the engine 22 (for example, during fuel cutting of the engine 22 or during non-load operation of the engine 22), the hybrid vehicle 20 of the embodiment starts load operation of the engine 22 with causing the engine 22 to be motored by the motor MG1 as needed basis. A method of setting the reference value Pst will be described later.

In the EV drive mode, the HVECU 70 sets the required torque Td*, based on the accelerator position Acc, the brake pedal position BP and the vehicle speed V. The HVECU 70 subsequently sets value 0 to the torque command Tm1*, and sets the torque command Tm2* of the motor MG2, such that the required torque Td* is output to the driveshaft 36. The HVECU 70 then sends the torque commands Tm1* and Tm2* of the motors MG1 and MG2 to the motor ECU 40. The motor ECU 40 controls the inverters 41 and 42 as described above.

As in the HV drive mode, when the calculated required power Pe* becomes equal to or higher than the reference value Pst that is higher than the reference value Psp, the hybrid vehicle 20 of the embodiment starts the engine 22 with causing the engine 22 to be motored by the motor MG1 in this EV drive mode. This shifts the drive mode to the HV drive mode and starts load operation of the engine 22.

Figure 2:
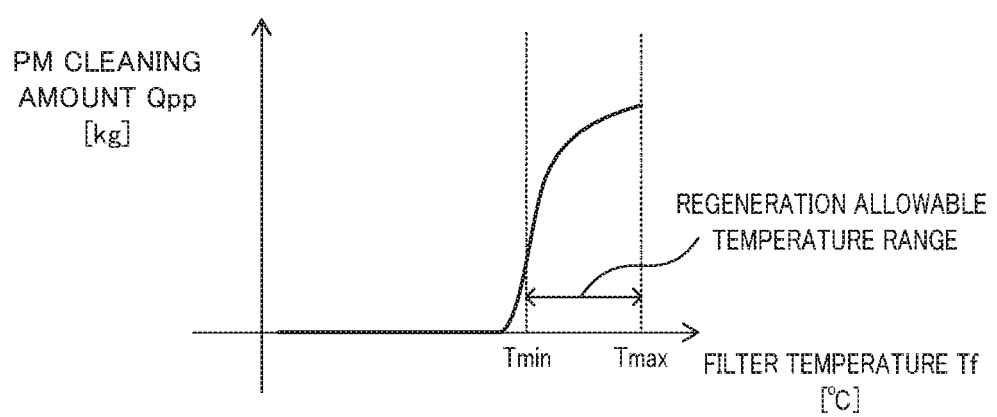
FIG. 2 is a diagram showing a relationship between a filter temperature Tf and a PM cleaning amount Qpp that denotes a cleaning amount of particulate matter on a PM filter after satisfaction of filter regeneration conditions.

In the HV drive mode, on satisfaction of filter regeneration conditions for regenerating the PM filter 25, when the fuel supply to the engine 22 is stopped (i.e., when fuel cutting of the engine 22 is stopped), the hybrid vehicle 20 of the embodiment causes the air (oxygen) to be supplied to the PM filter 25 and causes combustion of the particulate matter accumulated on the PM filter 25, thereby achieving regeneration of the PM filter 25. The filter regeneration conditions used herein are conditions that the accumulated amount of PM Qpm indicating the amount of the particulate matter accumulated on the PM filter 25 is equal to or greater than a reference value Qpmref and that the filter temperature Tf indicating the temperature of the PM filter 25 is equal to or higher than a reference value Tfref. The reference value Qpmref denotes a lower limit in an accumulated PM amount range that is determined to need regeneration of the PM filter 25 and may be, for example, 3 g/L, 4 g/L or 5 g/L. The reference value Tfref denotes a lower limit Tmin in a regeneration allowable temperature range suitable for regeneration of the PM filter 25 and may be, for example, 580° C., 600° C. or 620° C. FIG. 2 is a diagram showing a relationship between the filter temperature Tf and a PM cleaning amount Qpp that denotes a cleaning amount of the particulate matter on the PM filter 25 after satisfaction of the filter regeneration conditions. In the diagram, "Tmax" denotes an upper limit of the regeneration allowable temperature range. The filter regeneration conditions are accordingly conditions that there is a need for regeneration of the PM filter 25 and that the filter temperature Tf is in the regeneration allowable temperature range.

Figure 3:
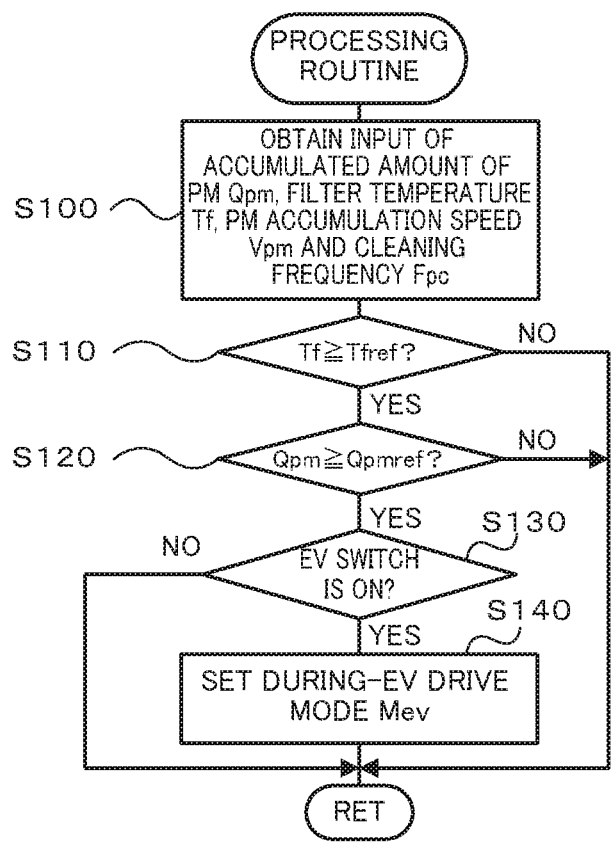
FIG. 3 is a flowchart showing one example of a processing routine performed by an HVECU according to the embodiment.

The following describes operations of the hybrid vehicle 20 of the embodiment having the above configuration and more specifically series of operations to set the drive mode in response to an ON operation of the EV switch 90 on satisfaction of the filter regeneration conditions described above. FIG. 3 is a flowchart showing one example of a processing routine performed by the HVECU 70 according to the embodiment. This routine is performed repeatedly.

When this routine is triggered, the HVECU 70 obtains input data, for example, the accumulated amount of PM Qpm, the filter temperature Tf, a PM accumulation speed Vpm and a cleaning frequency Fpc (step S100). The accumulated amount of PM Qpm is a value that is calculated (estimated) based on the pressure difference ΔP (ΔP=P1−P2) between the pressures P1 and P2 from the pressure sensors 25a and 25b and that is input from the engine ECU 24 by communication. The filter temperature Tf is a value that is calculated (estimated) based on the operating conditions of the engine 22 and that is input from the engine ECU 24 by communication. The PM accumulation speed Vpm denotes an accumulation speed of the particulate matter on the PM filter 25. The input PM accumulation speed Vpm is a value obtained by dividing the accumulated amount of PM Qpm since non-satisfaction of the filter regeneration conditions caused by regeneration of the PM filter 25 on satisfaction of the filter regeneration conditions, by a running distance D. The cleaning frequency Fpc denotes a number of times of cleaning Np of the PM filter 25 per unit running distance. The number of times of cleaning Np is counted as one cycle from satisfaction of the filter regeneration conditions to non-satisfaction of the filter regeneration conditions. The input cleaning frequency Fpc is a value obtained by dividing the number of times of cleaning Np by the running distance D.

After obtaining the input data, the HVECU 70 compares the input filter temperature Tf with the reference value Tfref described above (step S110) and also compares the input accumulated amount of PM Qpm with the reference value Qpmref described above (step S120). The processes of steps S110 and S120 are processes of determining whether the filter regeneration conditions described above are satisfied.

When the filter temperature Tf is lower than the reference value Tfref at step S110 or when the filter temperature Tf is equal to or higher than the reference value Tfref at step S110 but the accumulated amount of PM Qpm is less than the reference value Qpmref at step S120, the HVECU 70 determines that the filter regeneration conditions are not satisfied and terminates this routine. When the filter regeneration conditions are not satisfied, the hybrid vehicle 20 continues running in the previously set drive mode.

When the filter temperature Tf is equal to or higher than the reference value Tfref at step S110 and the accumulated amount of PM Qpm is equal to or greater than the reference value Qpmref at step S120, the HVECU 70 determines that the filter regeneration conditions are satisfied and subsequently determines whether the EV switch 90 is ON (step S130). When the EV switch 90 is OFF, the HVECU 70 terminates this routine. When the EV switch 90 is OFF, the hybrid vehicle 20 is driven in the HV drive mode or in the EV drive mode described above. When the fuel supply to the engine 22 is stopped (i.e., when fuel cutting is performed) in the HV drive mode, the air (oxygen) is supplied to the PM filter 25 to cause combustion of the particulate matter accumulated on the PM filter 25 and thereby achieve regeneration of the PM filter 25.

When the EV switch 90 is ON at step S130, the HVECU 70 sets a during-EV drive mode Mev using the accumulated amount of PM Qpm, the PM accumulation speed Vpm and the cleaning frequency Fpc (step S140) and terminates this routine. The during-EV drive mode Mev includes the EV drive mode described above (first drive mode), a cleaning priority mode (first mode of second drive mode) and an EV reject mode (second mode of second drive mode).

In the EV drive mode, the hybrid vehicle 20 of the embodiment is driven with stopping rotation of the engine 22. This reduces the supply of the air (oxygen) to the PM filter 25 and thereby suppresses regeneration of the PM filter 25. When the EV switch 90 is ON, however, the user desires to drive the hybrid vehicle 20 in the EV drive mode. In this state, driving the hybrid vehicle 20 in the EV drive mode suppresses the user from feeling strange.

Figure 4:
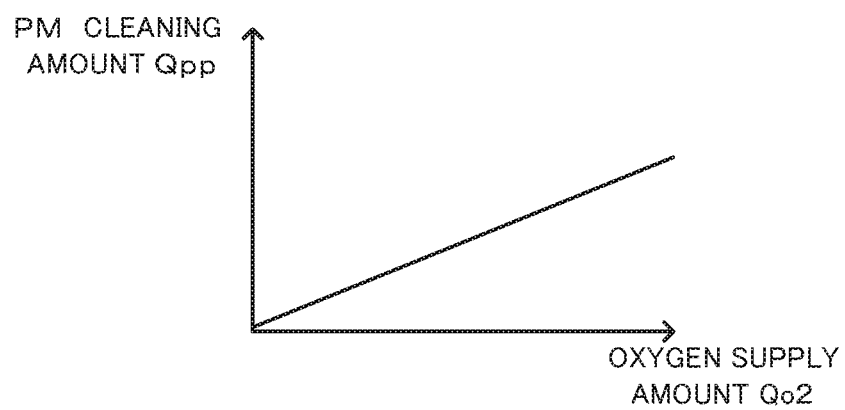
FIG. 4 is a diagram showing one example of a relationship between an amount of the air (oxygen) (oxygen supply amount) Qo2 supplied to the PM filter and the PM cleaning amount Qpp.

In the cleaning priority mode, the HVECU 70 sets the torque command Tm1* of the motor MG1 such that the rotation speed Ne of the engine 22 becomes equal to a predetermined rotation speed Neref with stop of operation of the engine 22, sets the torque command Tm2* of the motor MG2 such that the required torque Tr* is output to the driveshaft 36, and sends the set torque commands Tm1* and Tm2* to the motor ECU 40. When receiving the torque commands Tm1* and Tm2*, the motor ECU 40 performs switching control of the switching elements included in the inverters 41 and 42, such as to drive the motors MG1 and MG2 with the torque commands Tm1* and Tm2*. Such control idles the engine 22 and supplies the air (oxygen) to the PM filter 25. FIG. 4 is a diagram showing one example of a relationship between an amount of the air (oxygen) (oxygen supply amount) Qo2 supplied to the PM filter 25 and the PM cleaning amount Qpp. As illustrated, the greater oxygen supply amount Qo2 provides the greater PM cleaning amount Qpp, compared with the smaller oxygen supply amount Qo2. In other words, the PM cleaning amount Qpp increases with an increase in oxygen supply amount Qo2. Accordingly, the configuration of idling the engine 22 with causing the engine 22 to be motored by the motor MG1 enables a larger amount of the air (oxygen) to be supplied to the PM filter 25 and achieves regeneration of the PM filter, compared with a configuration of driving the hybrid vehicle 20 in the EV drive mode without causing the engine 22 to be motored by the motor MG1.

Figure 5:
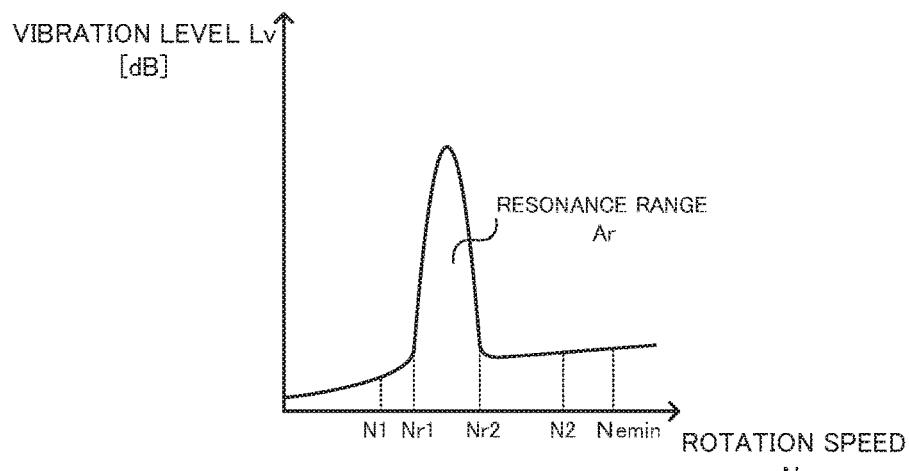
FIG. 5 is a diagram showing one example of a relationship between a rotation speed Ne of an engine and a magnitude of vibration of the vehicle (vibration level) Lv.
Figure 6:
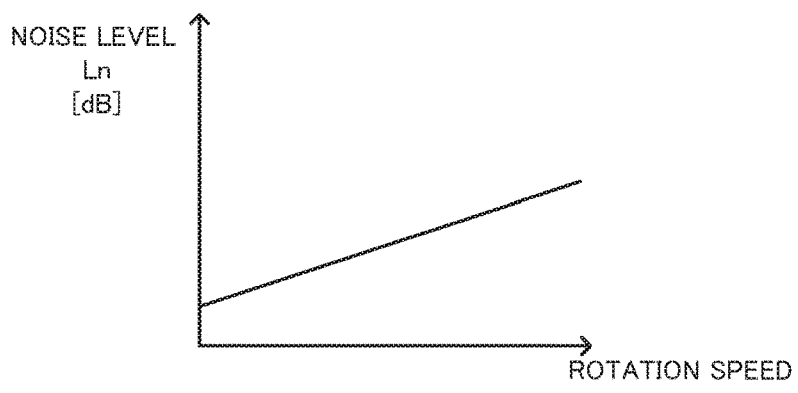
FIG. 6 is a diagram showing one example of a relationship between the rotation speed Ne of the engine and a magnitude of vehicle interior noise (noise level) Ln.
Figure 7:
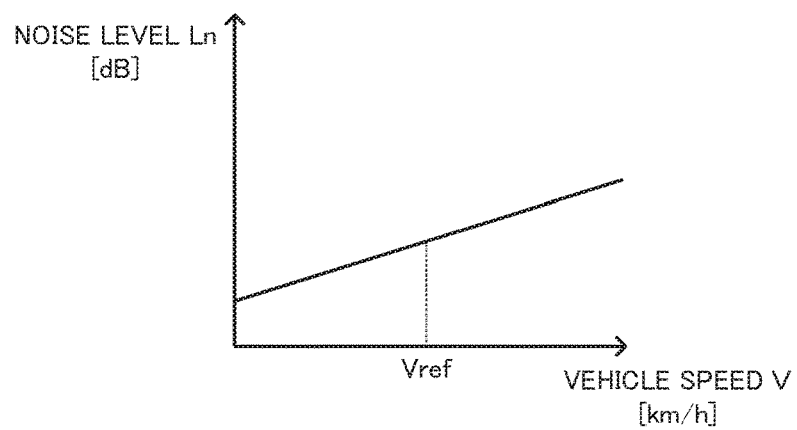
FIG. 7 is a diagram showing one example of a relationship between a vehicle speed V and the noise level Ln.

The following describes the predetermined rotation speed Neref. FIG. 5 is a diagram showing one example of a relationship between the rotation speed Ne of the engine 22 and a magnitude of vibration of the vehicle (vibration level) Lv. FIG. 5 shows the rotation speed Nemin when the engine 22 is motored and rotation speeds N1 and N2 (rotation speeds N1 and N2 will be described later). FIG. 6 is a diagram showing one example of a relationship between the rotation speed Ne of the engine 22 and a magnitude of vehicle interior noise (noise level) Ln. FIG. 7 is a diagram showing one example of a relationship between the vehicle speed V and the noise level Ln. As shown in FIG. 5, the rotation speed Ne of the engine 22 that is in the resonance range Ar of not lower than the rotation speed Nr1 and the not higher than the rotation speed Nr2 described above provides the higher vibration level Lv, compared with the rotation speed Ne of the engine 22 that is out of the resonance range Ar. As shown in FIG. 6, the higher rotation speed Ne of the engine 22 provides the higher noise level Ln, compared with the lower rotation speed Ne. In other words, the noise level Ln increases with an increase in rotation speed Ne of the engine 22. As shown in FIG. 7, the higher vehicle speed V provides the higher noise level Ln, compared with the lower vehicle speed V. In other words, the noise level Ln increases with an increase in vehicle speed V. Motoring of the engine 22 to a high rotation speed at a low vehicle speed V increases the power consumption by the motor MG1.

By taking into account the foregoing, the predetermined rotation speed Neref is set to be lower than the rotation speed Nemin that is set when the engine 22 is motored at the OFF position of the EV switch 90. This reduces the power consumption by the motor MG1 when the engine 22 is motored by the motor MG1, compared with the power consumption at the OFF position of the EV switch 90. When the vehicle speed V is lower than a predetermined vehicle speed Vref, the predetermined rotation speed Neref is set to a rotation speed N1 (for example, 280 rpm, 300 rpm or 320 rpm) that is lower than the rotation speed Nr1 and is higher than a value 0. When the vehicle speed V is equal to or higher than the predetermined vehicle speed Vref, on the other hand, the predetermined rotation speed Neref is set to a rotation speed N2 (for example, 800 rpm, 850 rpm or 900 rpm) that is higher than the rotation speed Nr2. The predetermined vehicle speed Vref is a value determined as a lower limit of the vehicle speed V that causes the running noise to drown out the operation noise generated during motoring of the engine 22 at the rotation speed N2. Setting the predetermined rotation speed Neref to the rotation speed N1 or to the rotation speed N2 causes the rotation speed Ne of the engine 22 to be a rotation speed out of the resonance range Ar. This suppresses vibration of the vehicle. The configuration of setting the predetermined rotation speed Neref to the rotation speed N2 that is higher than the rotation speed N1 when the vehicle speed V is equal to or higher than the predetermined vehicle speed Vref increases the supply amount of the air (oxygen) to the PM filter 25. This accelerates combustion of the particulate matter accumulated on the PM filter 25 and ensures the more sufficient regeneration of the PM filter 25. When the engine 22 is motored at the ON position of the EV switch 90, i.e., in response to the user's instruction for driving the hybrid vehicle 20 in the EV drive mode, the operation noise during motoring of the engine 22 is likely to give the user a feeling of strangeness. According to the embodiment, the engine 22 is motored at the rotation speed N2 when the vehicle speed V is equal to or higher than the predetermined vehicle speed Vref. This causes the running noise (background noise) to drown out the operation noise during motoring and makes the operation noise during motoring unnoticeable. This suppresses the user from feeling strange, while ensuring the more sufficient regeneration of the PM filter 25. When the vehicle speed V is lower than the predetermined vehicle speed Vref, the engine 22 is motored at the rotation speed N1. This further reduces the operation noise during motoring. This suppresses the user from feeling strange.

In the EV reject mode, the hybrid vehicle 20 is driven with prohibiting a drive in the EV drive mode and continuing operation of the engine 22 (or starting operation of the engine 22 when the engine 22 stops operation). When the fuel supply to the engine 22 is stopped, the air (oxygen) is supplied to the PM filter 25. This causes combustion of the particulate matter accumulated on the PM filter 25 and achieves regeneration of the PM filter 25. In the EV reject mode, the air (oxygen) is supplied to the PM filter 25 when the fuel supply to the engine 22 is stopped. The EV reject mode accordingly supplies the smaller amount of the air to the PM filter 25, compared with the cleaning priority mode. The EV reject mode, however, operates the engine 22 and thereby raises the filter temperature Tf, compared with the cleaning priority mode. In general, an increase in the filter temperature Tf makes a larger contribution to an increase in the PM cleaning amount Qpp, compared with an increase in the supply amount of the air (oxygen) to the PM filter 25 (i.e., an increase in the oxygen supply amount Qo2). Accordingly, the EV reject mode is likely to increase the PM cleaning amount Qpp, compared with the cleaning priority mode.

Figure 8:
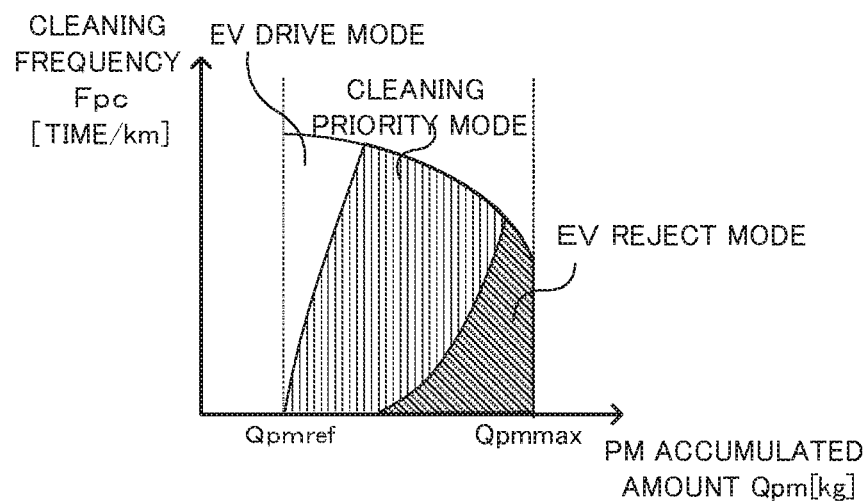
Figure 9:
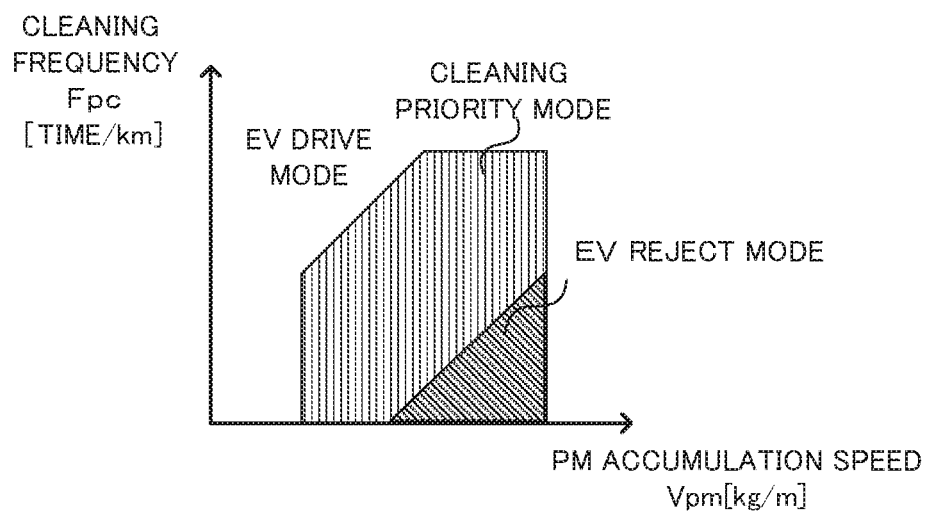

A relationship of the accumulated amount of PM Qpm, the PM accumulation speed Vpm and the cleaning frequency Fpc to the drive mode is determined and stored in advance in the form of a map. A procedure of step S140 reads a drive mode corresponding to the given accumulated amount of PM Qpm, the given PM accumulation speed Vpm and the given cleaning frequency Fpc from the map and sets the read drive mode to the during-EV drive mode Mev. FIG. 8 is a diagram showing one example of a relationship of the accumulated amount of PM Qpm and the cleaning frequency Fpc to the drive mode at a constant value of the PM accumulation speed Vpm when the EV switch 90 is ON. FIG. 9 is a diagram showing one example of a relationship of the PM accumulation speed Vpm and the cleaning frequency Fpc to the drive mode at a constant value of the accumulated amount of PM Qpm when the EV switch 90 is ON. As shown in FIGS. 8 and 9, the drive mode shifts from the EV drive mode to the cleaning priority mode to the EV reject mode in ascending order according to the accumulated amount of PM Qpm and the PM accumulation speed Vpm and in descending order according to the cleaning frequency Fpc. This is based on the tendency that the PM cleaning amount Qpp increases in the order of the EV drive mode, the cleaning priority mode and the EV reject mode.

Figure 10:
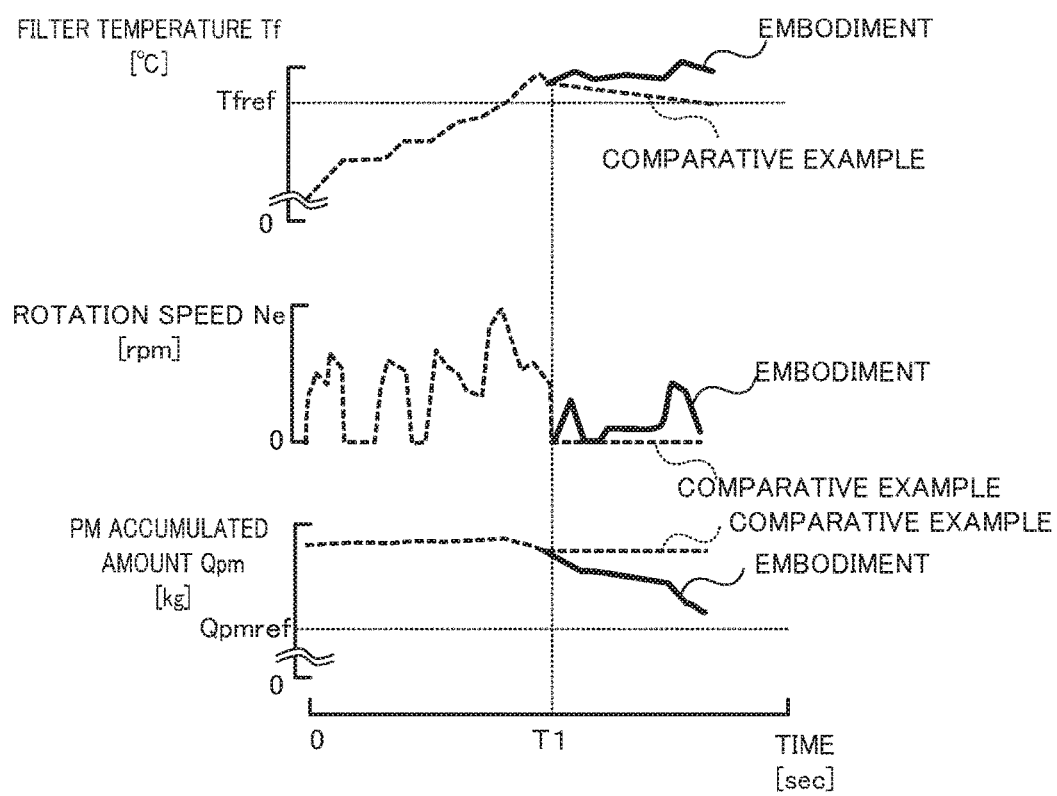
FIG. 10 is a diagram illustrating one example of time changes of the filter temperature Tf, the rotation speed Ne of the engine and the accumulated amount of PM Qpm.

After the during-EV drive mode Mev is set, the engine 22 and the motors MG1 and MG2 are controlled such that the vehicle is driven in the set drive mode. FIG. 10 is a diagram illustrating one example of time changes of the filter temperature Tf, the rotation speed Ne of the engine 22 and the accumulated amount of PM Qpm. In this diagram, a time T1 denotes a timing when the EV switch 90 is switched ON. Solid line curves after the time T1 indicate one example of time changes of the filter temperature Tf, the rotation speed Ne of the engine 22 and the accumulated amount of PM Qpm in the hybrid vehicle 20 of the embodiment. In the hybrid vehicle 20 of the embodiment, the cleaning priority mode is set as the during-EV drive mode Mev. Broken line curves after the time T1 indicate one example of time changes of the filter temperature Tf, the rotation speed Ne of the engine 22 and the accumulated amount of PM Qpm in a hybrid vehicle of a comparative example. The hybrid vehicle of the comparative example is driven in the EV drive mode after the ON operation of the EV switch 90. For a time period before the ON operation of the EV switch 90 (shown by broken line curves), both the hybrid vehicle 20 of the embodiment and the hybrid vehicle of the comparative example are driven in the HV drive mode.

When the EV switch 90 is switched ON, the hybrid vehicle of the comparative example stops operation (i.e., stops rotation) of the engine 22 and is driven in the EV drive mode. This decreases the amount of the air (oxygen) supplied to the PM filter 25. This accordingly suppresses combustion of the particulate matter accumulated on the PM filter 25 and reduces a change in the accumulated amount of PM Qpm.

When the EV switch 90 is switched ON, the hybrid vehicle 20 of the embodiment is driven in the cleaning priority mode in the illustrated example of FIG. 10. The hybrid vehicle 20 of the embodiment accordingly increases the amount of the air (oxygen) supplied to the PM filter 25, accelerates combustion of the particulate matter accumulated on the PM filter 25 and decreases the accumulated amount of PM Qpm, compared with the hybrid vehicle of the comparative example. The hybrid vehicle 20 of the embodiment thus secures the opportunity for regeneration of the PM filter 25, compared with the hybrid vehicle of the comparative example.

On satisfaction of the filter regeneration conditions, when the EV switch 90 is ON, the hybrid vehicle 20 of the embodiment described above controls the engine 22 and the motors MG1 and MG2 so as to be driven in the cleaning priority mode. This secures the opportunity for regeneration of the PM filter 25.

The hybrid vehicle 20 of the embodiment sets one drive mode among the three drive modes, i.e., the EV drive mode, the cleaning priority mode and the EV reject mode, according to the accumulated amount of PM Qpm, the PM accumulation speed Vpm and the cleaning frequency Fpc and controls the engine 22 and the motors MG1 and MG2 so as to be driven in the set drive mode. This secures the opportunity for regeneration of the PM filter 25, while suppressing the user from feeling strange.

Moreover, when the cleaning priority mode is set as the during-EV drive mode Mev, the hybrid vehicle 20 of the embodiment controls the engine 22 and the motor MG1 so as to cause the engine 22 to be motored at a lower rotation speed than the rotation speed Nemin set when the engine 22 is motored at the OFF position of the EV switch 90. This configuration reduces power consumption by the motor MG1, compared with the configuration of causing the engine 22 to be motored at the OFF position of the EV switch 90.

Additionally, when the cleaning priority mode is set as the during-EV drive mode, the hybrid vehicle 20 of the embodiment controls the engine 22 and the motor MG1 so as to reduce the rotation speed Ne of the engine 22 at the vehicle speed V that is equal to or higher than the predetermined vehicle speed Vref, compared with the rotation speed Ne of the engine 22 at the vehicle speed V that is lower than the predetermined vehicle speed Vref. This suppresses the operation noise during motoring of the engine 22 to give the user a feeling of strangeness.

On satisfaction of the filter regeneration conditions, when the EV switch 90 is ON, the hybrid vehicle 20 of the embodiment is driven in one drive mode selected among the three drive modes, i.e., the EV drive mode, the cleaning priority mode and the EV reject mode. According to a modification, however, on satisfaction of the filter regeneration conditions, when the EV switch 90 is ON, the hybrid vehicle may not employ the EV drive mode but may be driven either in the cleaning priority mode or in the EV reject mode.

On satisfaction of the filter regeneration conditions, when the EV switch 90 is ON, the hybrid vehicle 20 of the embodiment selects the drive mode according to the accumulated amount of PM Qpm, the PM accumulation speed Vpm and the cleaning frequency Fpc. According to a modification, however, the drive mode may be selected according to at least one of the accumulated amount of PM Qpm, the PM accumulation speed Vpm and the cleaning frequency Fpc. According to another modification, the drive mode may be selected according to the vehicle speed V. In the latter modification, the hybrid vehicle may select the cleaning priority mode as the drive mode when the vehicle speed V is equal to or higher than the predetermined vehicle speed Vref described above and may select the EV drive mode or the EV reject mode as the drive mode when the vehicle speed is lower than the predetermined vehicle speed Vref. Selecting the cleaning priority mode as the drive mode at the vehicle speed V that is equal to or higher than the predetermined vehicle speed Vref enables the running noise (background noise) to drown out the operation noise during motoring of the engine 22. This suppresses the operation noise during motoring of the engine 22 from giving the user a feeling of strangeness.

When the cleaning priority mode is set as the during-EV drive mode Mev, the hybrid vehicle 20 of the embodiment controls the engine 22 and the motor MG1, such that the engine 22 is motored at a lower rotation speed than the rotation speed Nemin set when the engine 22 is motored at the OFF position of the EV switch 90 and that the rotation speed Ne of the engine 22 during motoring at the vehicle speed V equal to or higher than the predetermined vehicle speed Vref is lower than the rotation speed Ne of the engine 22 during motoring at the vehicle speed V lower than the predetermined vehicle speed Vref. According to a modification, however, the rotation speed Ne of the engine 22 during motoring of the engine 22 may not be changed according to the vehicle speed V.

The hybrid vehicle 20 of the embodiment employs the drive mode with stopping operation of the engine 22 (EV forced mode) as the EV drive mode at the ON position of the EV switch 90. According to a modification, however, as the EV drive mode at the ON position of the EV switch 90, the hybrid vehicle may employ a drive mode that is driven with stopping operation of the engine 22 until the state of charge SOC of the battery 50 reaches a predetermined level Smin and that is driven in the HV drive mode when the state of charge SOC of the battery 50 becomes lower than the predetermined level Smin (EV priority mode). The predetermined level Smin is determined in advance as a lower limit of the state of charge SOC of the battery 50. The configuration of employing the EV priority mode increases the opportunity for operation of the engine 22 and thereby secures the more opportunity for regeneration of the PM filter 25, compared with the configuration of unconditionally employing the EV forced mode. According to another modification, the EV drive mode at the ON position of the EV switch 90 may include both the EV forced mode and the EV priority mode. In this modification, when the EV drive mode is set as the during-EV drive mode Mev at the ON position of the EV switch 90, the hybrid vehicle may be driven either in the EV forced mode or in the EV priority mode according to the accumulated amount of PM Qpm, the PM accumulation speed Vpm and the cleaning frequency Fpc. The drive mode may shift from the EV forced mode to the EV priority mode in ascending order according to the accumulated amount of PM Qpm and the PM accumulation speed Vpm and in descending order according to the cleaning frequency Fpc In the HV drive mode, when fuel cutting of the engine 22 is performed, the hybrid vehicle 20 of the embodiment may cause the engine 22 to be motored by the motor MG1 or may not cause the engine 22 to be motored by the motor MG1. According to a modification, however, when fuel cutting of the engine 22 is performed, the hybrid vehicle may always not cause the engine 22 to be motored by the motor MG1.

When the EV reject mode is selected at the ON position of the EV switch 90, the hybrid vehicle 20 of the embodiment controls the engine 22 and the motors MG1 and MG2 to be driven in the EV reject mode. According to a modification, however, the hybrid vehicle may provide a display indicating driving in the EV reject mode on the display 92, in addition to such control of the engine 22 and the motors MG1 and MG2. In this modification, providing a display indicating driving in the EV reject mode on the display 92 is not essential. For example, a notification device that provides certain information to the driver and the passengers by using a voice or the like may be mounted on the vehicle and may be used to inform the user of driving in the EV reject mode.

Figure 11:
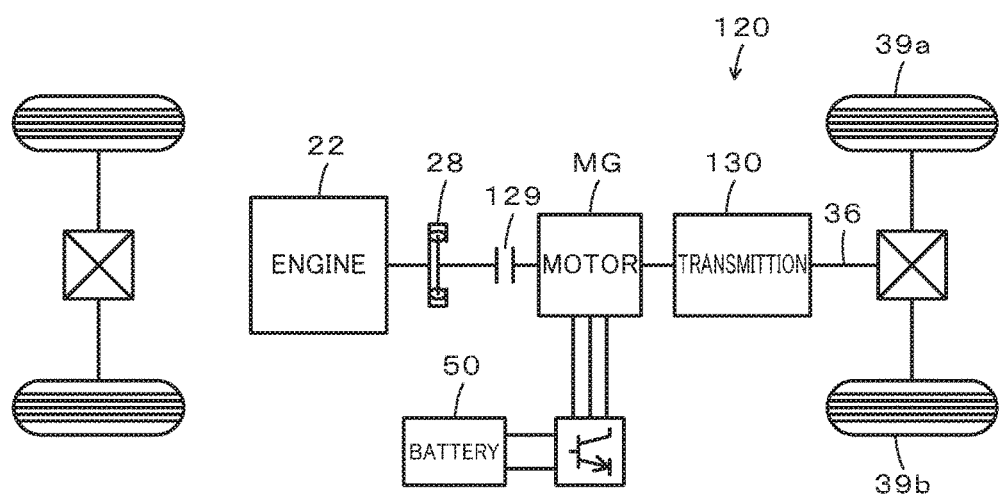
FIG. 11 is a configuration diagram illustrating the schematic configuration of a hybrid vehicle according to a modification.

The above embodiment describes the application of the present disclosure to the hybrid vehicle 20 configured such that the motor MG1 is connected with the sun gear of the planetary gear 30, that the engine 22 is connected with the carrier of the planetary gear 30 via the damper 28 and that the motor MG2 and the driveshaft 36 coupled with the drive wheels 39a and 39b are connected with the ring gear of the planetary gear 30. The present disclosure may, however, be applied to a hybrid vehicle of any configuration that includes an engine for driving equipped with a filter for removal of the particulate matter in an exhaust system, and a motor for driving. For example, the present disclosure may be applied to a hybrid vehicle 120 of a modification configured such that a motor MG is connected via a transmission 130 with a driveshaft 36 coupled with drive wheels 39a and 39b and that an engine 22 is connected with the motor MG via a clutch 129 as shown in FIG. 11. In this modification, the engine 22 may be motored by the motor MG, and the rotation speed Ne of the engine 22 may be adjusted by regulating the change gear ratio of the transmission 130 to regulate the rotation speed of the motor MG. The hybrid vehicle 120 of the modification may be configured without the transmission 130. In this modified configuration, the engine 22 may be motored by the motor MG, and the rotation speed Ne of the engine 22 may be adjusted by regulating the torque output from the motor MG.

In the hybrid vehicle of the above aspect, on satisfaction of the filter regeneration conditions, even when the first drive mode is selected by the mode selection device, the control device may control the engine and the motor to cause the hybrid vehicle to be driven in the second drive mode upon non-satisfaction of a predetermined condition that is based on at least one of an accumulated amount of the particulate matter, an accumulation speed at which the particulate matter is accumulated on the filter, and a frequency of cleaning of the filter, while controlling the engine and the motor to cause the hybrid vehicle to be driven in the first drive mode upon satisfaction of the predetermined condition. The "predetermined condition" may be a relationship between the accumulated amount of the particulate matter, the accumulation speed and the frequency of cleaning of the filter that is determined in advance as a relationship which does not make a strong request for cleaning of the filter and may be, for example, a small accumulated amount of the particulate matter, a slow accumulation speed or a high frequency of cleaning of the filter. Rotation of the engine irrespective of the user's selection of the first drive mode is likely to cause the user to feel strange. The configuration of driving the hybrid vehicle in the first drive mode on satisfaction of the predetermined condition suppresses the user from feeling strange.

In the hybrid vehicle of the above aspect, the second drive mode may include a first mode in which the hybrid vehicle is driven with stopping operation of the engine and causing the engine to be motored by the motor, and a second mode in which the hybrid vehicle is driven with prohibiting a drive in the first drive mode and continuing operation of the engine. The state of "continuing operation of the engine" includes the state of stopping the fuel supply to the engine (fuel cutting) in response to, for example, an accelerator-off operation. In the hybrid vehicle of this aspect, on satisfaction of the filter regeneration conditions, when the first drive mode is selected by the mode selection device, the control device may set one of the first drive mode, the first mode of the second drive mode and the second mode of the second drive mode as the drive mode, based on at least one of the accumulated amount of the particulate matter, the temperature of the filter and the accumulation speed at which the particulate matter is accumulated on the filter, and may control the engine and the motor to cause the hybrid vehicle to be driven in the set drive mode.

In the hybrid vehicle of the above aspect, the hybrid vehicle may include a first motor, a planetary gear configured such that three rotational elements thereof are respectively connected with a driveshaft coupled with drive wheels, an output shaft of the engine, and a rotating shaft of the first motor, and a second motor connected with the driveshaft and configured as the motor for driving. The second drive mode may include a first mode in which the hybrid vehicle is driven with stopping operation of the engine and causing the engine to be motored at a predetermined rotation speed by the first motor, and a second mode in which the hybrid vehicle is driven with prohibiting a drive in the first drive mode and continuing operation of the engine. The state of "continuing operation of the engine" includes the state of stopping the fuel supply to the engine (fuel cutting) in response to, for example, an accelerator-off operation. In the hybrid vehicle of this aspect, on satisfaction of the filter regeneration conditions, when the first drive mode is selected by the mode selection device, the control device may set one of the first drive mode, the first mode of the second drive mode and the second mode of the second drive mode as the drive mode, based on at least one of the accumulated amount of the particulate matter, the temperature of the filter and the accumulation speed at which the particulate matter is accumulated on the filter, and may control the engine, the first motor and the second motor to cause the hybrid vehicle to be driven in the set drive mode.

In the hybrid vehicle of the above aspect configured such that the second drive mode includes the first mode and the second mode, on satisfaction of the filter regeneration conditions, when the first drive mode is selected by the mode selection device and the hybrid vehicle is driven in the first mode of the second drive mode, the control device may control at least the engine and the motor to cause the engine to be motored at a lower rotation speed, compared with a rotation speed at which the engine is motored with stopping fuel supply to the engine when the first drive mode is not selected by the mode selection device. This configuration suppresses an increase in power consumption when the engine is motored.

In the hybrid vehicle of the above aspect configured such that the second drive mode includes the first mode and the second mode, on satisfaction of the filter regeneration conditions, when the first drive mode is selected by the mode selection device and the hybrid vehicle is driven in the first mode of the second drive mode, the control device may control at least the engine and the motor to cause the engine to be motored at a higher rotation speed when a vehicle speed is equal to or higher than a predetermined vehicle speed, compared with a rotation speed at which the engine is motored when the vehicle speed is lower than the predetermined vehicle speed. The "predetermined vehicle speed" is a reference value used to determine whether the running noise (background noise) is large or not. When the engine is motored irrespective of the user's selection of the first drive mode, the operation noise during motoring may give the user a feeling of strangeness. The running noise at the vehicle speed that is equal to or higher than the predetermined vehicle speed is larger than the running noise at the vehicle speed that is lower than the predetermined vehicle speed. This causes the running noise to drown out the operation noise during motoring of the engine and thereby makes the operation noise during motoring of the engine unnoticeable. This suppresses the user from feeling strange.

The hybrid vehicle of the above aspect configured such that the second drive mode includes the first mode and the second mode may further comprise a notification device that provides information. On satisfaction of the filter regeneration conditions, when the first drive mode is selected by the mode selection device and the hybrid vehicle is driven in the second mode of the second drive mode, the control device may control the notification device to provide information indicating that the hybrid vehicle is driven in the second mode of the second drive mode. When the hybrid vehicle is driven in the second mode of the second drive mode with operation of the engine irrespective of the user's selection of the first drive mode, the user is likely to feel strange. When the hybrid vehicle is driven in the second mode of the second drive mode, the hybrid vehicle of this configuration controls the notification device to provide the information indicating that the hybrid vehicle is driven in the second mode of the second drive mode. This reduces the user's feeling of strangeness.

In the hybrid vehicle of the above aspect configured such that the second drive mode includes the first mode and the second mode, on satisfaction of the filter regeneration conditions, when the first drive mode is not selected by the mode selection device, the control device may control at least the engine and the motor to cause the hybrid vehicle to be driven in the first mode of the second drive mode. This configuration accelerates the supply of the air to the filter and thereby secures the more sufficient regeneration of the filter.

The following describes the correspondence relationship between the primary components of the embodiment and the primary components of the disclosure described in Summary. The engine 22 of the embodiment corresponds to the "engine", the motor MG2 corresponds to the "second motor", the EV switch 90 corresponds to the "mode selection device" and the HVECU 70, the engine ECU 24, the motor ECU 40 and the battery ECU 52 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The disclosure is applicable to, for example, the manufacturing industries of hybrid vehicles.

The invention claimed is:

1. A hybrid vehicle, comprising:
an engine for driving equipped with a filter for removal of particulate matter in an exhaust system;
a motor for driving;
a mode selection device configured to select one drive mode among a plurality of drive modes according to a user's operation, wherein the plurality of drive modes include a first drive mode in which the hybrid vehicle is driven with power from the motor with stopping rotation of the engine and a second drive mode in which the hybrid vehicle is driven with rotation of the engine; and
a control device configured to control the engine and the motor, wherein
on satisfaction of filter regeneration conditions that an accumulated amount of the particulate matter accumulated on the filter is equal to or greater than a predetermined accumulated amount and that a temperature of the filter is equal to or higher than a predetermined temperature, the control device causes the hybrid vehicle to be driven in the second drive mode even when the first drive mode is selected by the mode selection device.

2. The hybrid vehicle according to claim 1, wherein on satisfaction of the filter regeneration conditions, even when the first drive mode is selected by the mode selection device, the control device controls the engine and the motor to cause the hybrid vehicle to be driven in the second drive mode upon non-satisfaction of a predetermined condition that is based on at least one of an accumulated amount of the particulate matter, an accumulation speed at which the particulate matter is accumulated on the filter, and a frequency of cleaning of the filter, while controlling the engine and the motor to cause the hybrid vehicle to be driven in the first drive mode upon satisfaction of the predetermined condition.

3. The hybrid vehicle according to claim 1,
wherein the second drive mode includes a first mode in which the hybrid vehicle is driven with stopping operation of the engine and causing the engine to be motored by the motor, and a second mode in which the hybrid vehicle is driven with prohibiting a drive in the first drive mode and continuing operation of the engine.

4. The hybrid vehicle according to claim 1, further comprising:
a first motor;
a planetary gear configured such that three rotational elements thereof are respectively connected with a driveshaft coupled with drive wheels, an output shaft of the engine, and a rotating shaft of the first motor; and
a second motor connected with the driveshaft and configured as the motor for driving, wherein
the second drive mode includes a first mode in which the hybrid vehicle is driven with stopping operation of the engine and causing the engine to be motored at a predetermined rotation speed by the first motor, and a second mode in which the hybrid vehicle is driven with prohibiting the first drive mode and continuing operation of the engine.

5. The hybrid vehicle according to claim 3,
wherein on satisfaction of the filter regeneration conditions, when the first drive mode is selected by the mode selection device and the hybrid vehicle is driven in the first mode of the second drive mode, the control device controls at least the engine and the motor to cause the engine to be motored at a lower rotation speed, compared with a rotation speed at which the engine is motored with stopping fuel supply to the engine when the first drive mode is not selected by the mode selection device.

6. The hybrid vehicle according to claim 3,
wherein on satisfaction of the filter regeneration conditions, when the first drive mode is selected by the mode selection device and the hybrid vehicle is driven in the first mode of the second drive mode, the control device controls at least the engine and the motor to cause the engine to be motored at a higher rotation speed when a vehicle speed is equal to or higher than a predetermined vehicle speed, compared with a rotation speed at which the engine is motored when the vehicle speed is lower than the predetermined vehicle speed.

7. The hybrid vehicle according to claim 3, further comprising:
a notification device that provides information, wherein
on satisfaction of the filter regeneration conditions, when the first drive mode is selected by the mode selection device and the hybrid vehicle is driven in the second mode of the second drive mode, the control device controls the notification device to provide information indicating that the hybrid vehicle is driven in the second mode of the second drive mode.

8. The hybrid vehicle according to claim 3,
wherein on satisfaction of the filter regeneration conditions, when the first drive mode is not selected by the mode selection device, the control device controls at least the engine and the motor to cause the hybrid vehicle to be driven in the first mode of the second drive mode.

* * * * *